United States Patent [19]

Northcote

[11] 4,080,932
[45] Mar. 28, 1978

[54] INDUSTRIAL BOILERS

[75] Inventor: Reginald Dennis Northcote, Lower Penn, England

[73] Assignee: Parkinson Cowan GWB Limited, Dudley, England

[21] Appl. No.: 724,180

[22] Filed: Sep. 17, 1976

[30] Foreign Application Priority Data

Sep. 20, 1975 United Kingdom ............... 38697/75

[51] Int. Cl.² ........................... F22B 7/12; F23C 1/10; F23C 1/12; F23J 3/00
[52] U.S. Cl. ................................... 122/149; 110/261; 110/204
[58] Field of Search ........... 122/149; 110/22 R, 22 A, 110/49 R

[56] References Cited

U.S. PATENT DOCUMENTS

| 1,077,405 | 11/1913 | Gutsch | 110/49 |
| 2,143,820 | 1/1939 | Payn | 110/22 |
| 3,244,220 | 4/1966 | Koeoker | 110/22 |
| 4,002,148 | 1/1977 | Harding | 122/149 |

FOREIGN PATENT DOCUMENTS

| 1,355,054 | 5/1974 | United Kingdom | 122/149 |

Primary Examiner—Kenneth W. Sprague
Attorney, Agent, or Firm—Arnold, White & Durkee

[57] ABSTRACT

An industrial boiler installation, comprising an outer continuous shell within which is contained the water space of the boiler, a furnace and a plurality of smoke tubes for passage therethrough of the products of combustion of the furnace and the boiler having at least two fuel supply means, at least one of which extends through the shell and the water space, one of the fuel supply means supplying HCV fuel to the furnace and the other supplying LCV fuel to the furnace.

6 Claims, 5 Drawing Figures

INDUSTRIAL BOILERS

BACKGROUND OF THE INVENTION

Field of the Invention

This invention relates to an industrial boiler.

An object of the invention is to provide a new and improved industrial boiler.

SUMMARY OF THE INVENTION

According to the present invention we provide an industrial boiler comprising an outer continuous shell within which is contained the steam and/or water space of the boiler, a furnace grate and a plurality of smoke tubes for passage therethrough of the products of combustion of the furnace and the boiler having at least two fuel supply means, at least one of which extends through the shell and the steam and/or water space, one of the fuel supply means supplying HCV fuel to the furnace and the other supplying LCV fuel to the furnace.

In this specification the term "HCV fuel" refers to a high calorific value fuel having a calorific value of above about 8,000 Btu per lb., for example fuel oil, gas, coal, whilst the term "LCV fuel" refers to a low calorific value fuel having a calorific value of about 8,000 Btu. per lb. or less, for example, aqueous waste oil, fumes, i.e. relatively large quantities of air discharged from processing ovens and containing relatively small amounts of hydrocarbons, solvents, solids such as wood, paper or cardboard, with a high moisture content, certain agricultural refuse and the like. The calorific value of the LCV fuels is such that they may contain insufficient combustible matter to enable them to support combustion without the assistance of the primary fuel.

The boiler may be provided with an axial gaseous or liquid fuel burner positioned so as to project a flame into the furnace in a direction parallel to the axis thereof and the boiler may be provided with a conduit which extends generally vertically downwardly through the shell and the steam and/or water space of the boiler and through the roof of the furnace, or through the side walls.

The HCV fuel may be introduced into the furnace through the axial burner and the LCV fuel introduced through a burner positioned in said conduit.

Alternatively the LCV fuel may be introduced through the axial burner and the HCV fuel through a burner positioned in the conduit.

The term "burner" is intended to include any device for introducing fuel into the furnace, whether the fuel is prepared i.e. shredded paper or paper and wastes baled and ram fed into the furnace.

There may be an upwardly extending conduit which passes upwardly through the shell of the boiler and through the floor of the furnace to a position adjacent the grate therein, the grate may be covered with a refractory material and the LCV fuel may be introduced by a suitable means through said vertically upwardly extending conduit, the HCV fuel being introduced into the boiler either through the axial burner or being introduced through the downwardly extending conduit, the refractory covered fire grate being heated to facilitate burning of the LCV fuel.

If desired the LCV fuel may comprise fumes, and the fumes may be mixed with a gaseous primary fuel and introduced into the furnace through said axial burner.

At least part of the furnace may be lined with a refractory material so as to provide a mixing chamber wherein the LCV fuel is mixed with the HCV fuel and remains in the furnace for a sufficiently long residence time to be combusted so that the LCV fuel is fully combusted before the products of combustion leave the furnace and enter the smoke tubes.

Since the HCV and/or LCV fuel may give rise to corrosive products of combustion, for example if the fuels contain sulphur in relatively large amounts it is a further object of the invention to provide means whereby damage to the boiler by the corrosive product of combustion is avoided or reduced.

Accordingly a boiler embodying the invention may also include a primary fuel supply means operative to normally fire the boiler and an auxiliary fuel supply means operative to supply a non-corrosive fuel to fire the boiler and control means to render the primary fuel supply means inoperative and the auxiliary fuel supply means operative prior to the boiler being placed in a "low load" condition.

The control means may include a pressure sensitive device operative to render the primary fuel supply means inoperative, the auxiliary fuel supply means operative and, preferably, to close a steam "shut-off" valve when the pressure of steam produced by the boiler attains a first predetermined value and operative to place the auxiliary fuel supply means in a "low load" condition when the pressure attains a second, higher predetermined value.

The term "low load" condition is intended to cover both the case where the burner is turned completely off and the case where the fuel burnt at the boiler is considerably reduced compared with the normal condition.

The term "non-corrosive" fuel is intended to refer to a commercial fuel, such as fuel oil or natural gas, of which the products of combustion are substantially non-corrosive.

The primary and auxiliary fuel supply means may comprise liquid or gaseous fuel burners.

The fuel supplied by the primary fuel supply means may comprise a HCV or LCV fuel.

Preferably the fuel burnt at the auxiliary fuel supply means is a gaseous fuel such as natural gas.

The boiler may be a horizontal smoke tube boiler comprising a shell containing said combustion chamber and said at least one pass of smoke tubes for the passage of the products of combustion from the combustion chamber to said flue through which the combustion products leave the shell.

There may be a single pass of smoke tubes axially aligned with the combustion chamber so that the products of combustion pass from the combustion chamber through the smoke tubes to the flue without any reversal of their direction of flow.

Alternatively there may be a pass of smoke tubes parallel to the combustion chamber and spaced transversely thereof and there being a smoke box inter-connecting the combustion chamber and one end of said pass whilst the other end of the pass is connected to the flue so that the products of combustion pass from the combustion chamber to the flue with a single reversal of the direction of flow. Such a boiler will be hereinafter referred to as a "two-pass boiler of the type described".

Further alternatively, there may be a first pass of smoke tubes parallel to the combustion chamber and spaced transversely thereof and there being a first smoke box inter-connecting the combustion chamber and one end of the first pass and a second smoke box inter-connecting the other end of the first pass and one end of a second pass of smoke tubes also parallel to the combustion chamber and spaced transversely thereof, the other end of the second pass being connected to the flue so that the products of combustion pass from the combustion chamber to the flue with two reversals of their direction of flow. Such a boiler will be hereinafter referred to as "a three-pass boiler of the type described".

A problem which occurs in such boilers is that the temperature in the flue or in the chimney to which the flue extends can be below the dewpoint of the products of combustion so that the condensation of water or other vapour occurs and the resultant condensate is undesirable.

Accordingly, to overcome or reduce the above-mentioned problem, alternatively, or in addition to the above described primary and auxiliary fuel supply means, a plurality of damper controlled bypasses capable of permitting the products of combustion to by-pass each pass of smoke tubes may be provided, the bypasses being arranged so as to distribute the relatively hot, bypassed combustion gases over a substantial part of the wall of an outlet flue of the boiler.

The dampers may be controlled by a thermosensitive device response to the temperature of the gas in the chimney or in one of the smoke tubes.

Further alternatively, the boiler may be a three-pass boiler of the type described having a damper controlled by-pass which is capable of interconnecting the first and second smoke boxes to enable a substantial portion of the combustion gases to bypass the second pass of the boiler when the damper is opened, the damper being controlled by a thermosensitive device responsive to the temperature of the gas either in a smoke tube or in the chimney.

According to another aspect of the present invention we provide a multi-fuel boiler comprising an outer continuous shell within which is contained the steam and-/or water space of the boiler, a furnace grate, a plurality of fire tubes for passage therethrough of the products of combustion of the furnace and a means for supplying solid fuel downwardly through the shell and the steam and/or water space of the shell to feed the grate and having a liquid or gaseous fuel burner positioned so as to direct a flame generally axially into the furnace. A means is provided to introduce the HCV fuel at the position of said solid fuel supply means and the LCV fuel at the position of said burners or vice versa so that the boiler can operate on LCV and HCV fuels.

In the case where the boiler is provided with a de-ashing tube which extends vertically upwardly from the underside of the shell to the furnace grate, the method may include the alternative step of providing a means for introducing LCV fuel through the de-ashing tube and providing means to introduce HCV fuel into the furnace at the position of the burners or at the position of the solid fuel supply means or vice versa.

BRIEF DESCRIPTION OF THE DRAWINGS

The invention will now be described in more detail by way of example with reference to the accompanying drawings wherein.

DESCRIPTION OF THE PREFERRED EMBODIMENT

Figure 1:
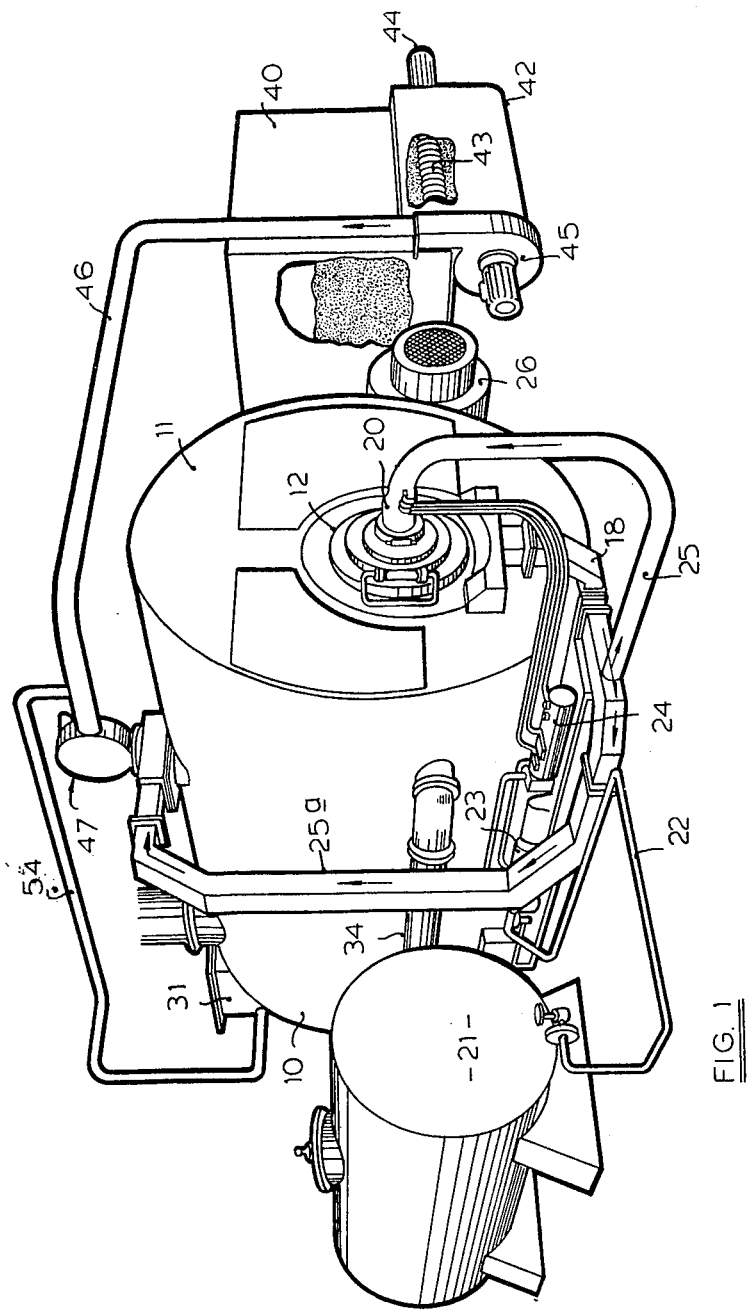
FIG. 1 is a perspective view of a boiler embodying the invention.
Figure 2:
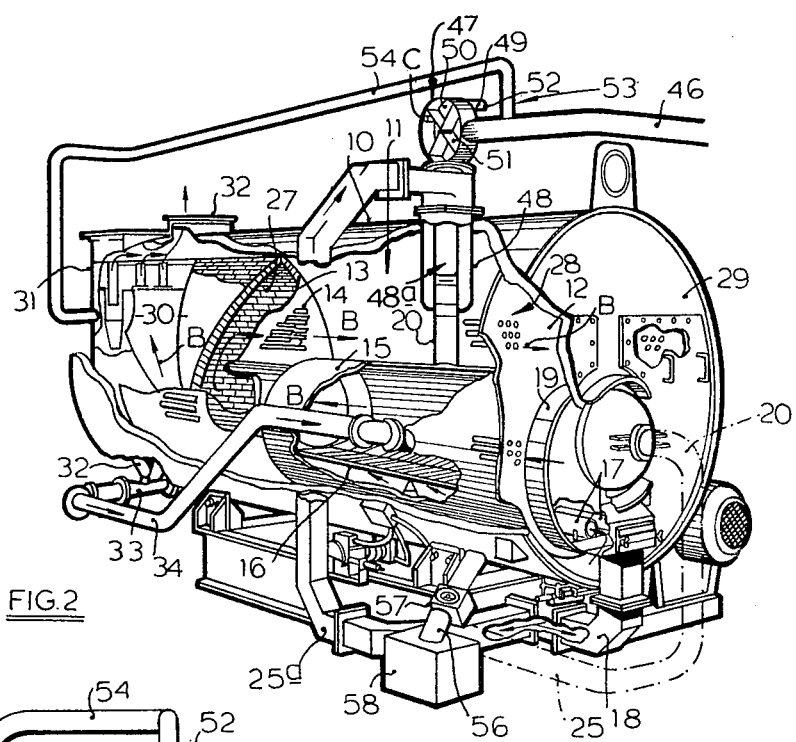
FIG. 2 is a perspective view partly broken away of the boiler of FIG. 1.
Figure 3:
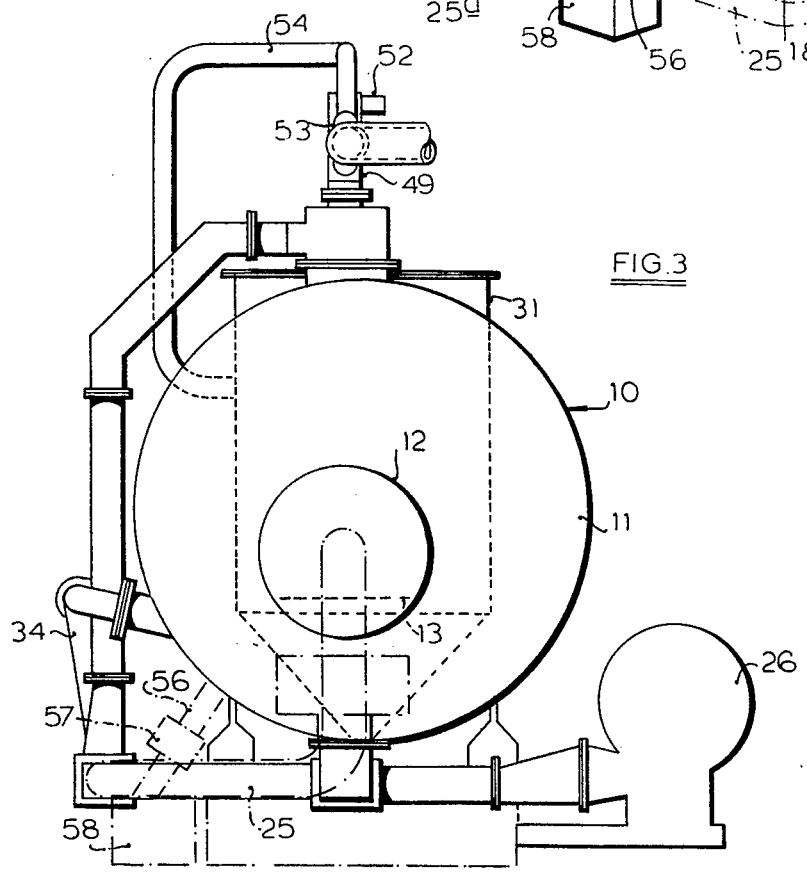
FIG. 3 is a front elevation of the boiler of FIG. 1.

Many industries, such as the chemical, petroleum, paint, varnish and other industries generate waste liquid and fumes, the disposal of which creates a problem. The present invention permits such waste products to be disposed of conveniently and economically by using them as a low calorific value fuel for a steam/water boiler. Examples of such waste products of low calorific value below 8,000 Btu per lb. are water contaminated used-lubricating oil; aromatic tar comprising hydro-carbons and containing, for example up to 60% sulphuric acid; liquid residue comprising paint, pigment, dies, traces of solvent and water, grit arising from the combustion of residual fuel oil in power station boilers; fumes arising from ovens used to strip PVC and polythene; carbon monoxide; hydrogen sulphide, hydrogen, cyanide; chlorinated hydro-carbons; fumes from food processing plant, such as fumes extracted from fish fryers, fish-meal dryers, offal boilers and rendering plant; oven exhaust from solvent paint dryers, plastic coating dryers; quenching processes and the like.

Referring now to the drawings, there is shown a shell boiler comprising an enveloping shell 10, the majority of which encloses steam drum or water space 11. Positioned within the shell 10 are plates 12, 13 between which extend a plurality of series of smoke tubes 14 as well as a cylindrical combustion chamber 15. Positioned within the combustion chamber 15 is a refractory covered grate 16 to the underside of which is fed primary air through tubes 17 and a duct 18, as shown by the arrows A.

Between the rear end wall of the shell 10 and the tube plate 13 is provided a first smoke box 27 so that the products of combustion from the furnace chamber 15 pass, as shown by the arrows B, into the smoke box 27 and then through a first series of smoke tubes 14 arranged parallel to the axis of the furnace chamber 15 to a secondary smoke box 28 provided between the tube plate 12 and the front end wall 29 of the shell.

The products of combustion then pass through a further series of the smoke tubes 14 to a chamber 30 at the rear of the boiler and this chamber contains a grit arrestor 31 for separating grit from the combustion products which then pass through a flue 32 and hence into a chimney, not shown.

The grit from the grit arrestor 31 passes through a conduit 32 into a venturi neck 33 provided in a conduit 34, which extends from the blower 26 in the furnace chamber 15 at a position adjacent the front end thereof so that a venturi action provides suction to draw grit from the arrestor 31 into the conduit 34 and so that the grit is introduced into the combustion chamber at a position adjacent the front of the furnace.

The furnace illustrated in the drawings is a multi-fuel furnace and accordingly the furnace or combustion chamber 15 is provided at its front end 19 with an oil or gas burner. In the drawings an oil burner 20 is shown to which oil is fed under pressure from an oil tank 21 through a line 22 containing a pump 23 and an electrical pre-heater 24.

A burner air supply duct 25 extends from a blower 26 and is arranged to feed burner air into the combustion chamber 15 along a horizontal axis coincident with the axis of the oil burner 20. The hereinbefore mentioned primary air duct 18 branches from the burner air supply duct 25.

The furnace is also provided with a conduit 48 which extends vertically downwards through the shell 10 and steam water space 11 of the boiler and passes through the roof of the furnace chamber 15. This conduit in the unmodified boiler, is provided with means, not shown, to introduce solid fuel such as coal onto the grate 16 of the furnace. In this case the solid fuel is contained within a hopper 40 at the base of which is located a screw conveyor 43 driven by motor 44.

The conveyor 43 is arranged to deliver the fuel to a feel pipe 46 leading from a pneumatic blower 45 to a feeding apparatus 47 so that the fuel is fed pneumatically to the feeding apparatus 47.

Secondary combustion air supplied through a branch 25a of the duct 25 is fed into the furnace chamber 15 through passageways associated with the conduit 48.

When it is desired to burn LCV fuel in such a furnace the furnace may be modified in one of a number of ways.

The LCV fuel, for example, waste fumes, may be fed to a gas burner positioned at the front end 19 of the furnace, for example, by replacing the oil burner 20 with a gaseous burner. Suitable HCV fuel is then fed into the furnace through the vertically downwardly extending conduit 48. If the HCV fuel is oil or gas then an appropriate type of burner is positioned within the conduit 48 so as to fire the oil or gas into the furnace chamber to facilitate burning of the LCV fuel which, as explained hereinbefore, is itself deficient in sufficient combustible matter to support effective combustion to destroy the waste fumes.

Alternatively, the LCV fuel may be introduced through a gas burner positioned in the conduit 48 and the HCV fuel through a burner positioned at the front end 19 of the combustion chamber.

It will of course be appreciated that if it is desired to use a liquid HCV or LCV fuel then appropriate burners will be provided.

The furnace is normally provided with a de-ashing tube which extends vertically upwardly through the underside of the shell to a position beneath the grate of the furnace so that when the furnace is operating with solid fuel the ash deposited on the grate may be removed.

Another possible modification of such a furnace is to provide a suitable means for introducing a LCV fuel through the ash pipe and burning it with the aid of HCV fuel introduced either at the front 19 of the furnace chamber or through the conduit 48.

Alternatively, the LCV fuel may be introduced through the conduit 48 or at the front of the furnace and the HCV fuel through the de-ashing pipe.

In all the above cases the grate and a part of the furnace chamber may be lined with a refractory material which is heated by the HCV fuel thus facilitating heating, mixing and retention of the LCV fuel within the combustion chamber for a sufficient residence period for the LCV fuel to be adequately combusted before leaving the combustion chamber and passing through the smoke tubes.

A further possibility in the case of a gaseous LCV fuel is to mix a desired proportion of HCV fuel with the LCV fuel to introduce the mixture to a gas burner at the front 19 of the combustion chamber.

LCV fuels frequently contain substances which give rise to corrosive, or otherwise undesirable, condensates in the flue and/or chimney of the boiler when the temperature of the gases therein falls below the dewpoint thereof. For example, in the case of waste oil, this contains a relatively large amount of sulphur and consequently sulphur containing condensates are formed.

One cause of the temperature of the gases falling below the dewpoint is as a result of the boiler being turned to a "low fire" condition.

In order to avoid this problem the following arrangement is adopted.

This arrangement comprises the provision of an auxiliary burner at an appropriate one of the locations previously described for feeding to the furnace a fuel which does not contain any corrosive, or otherwise undesirable, condensate, for example, natural gas, together with a control arrangement whereby the auxiliary burner is rendered operative and the previously operating primary fuel supply rendered inoperative prior to the boiler being placed in a "low fire" condition so that the boiler is purged of products of combustion containing substances which could lead to the formation of undesirable condensates before the auxiliary burner is turned to a "low fire" condition.

The auxiliary burner may be positioned, for example, as indicated at 48a in the conduit 48.

The control means may comprise a pressure sensitive device, not shown, which is operative when the pressure of steam produced by the boiler exceeds a first predetermined value to switch off the HCV and LCV fuel supply means and to switch on the auxiliary burner and to close a steam shut-off valve so that no steam is supplied from the boiler. The control means is also operative when the pressure exceeds a second, higher, predetermined value to turn the auxiliary burner to a "low fire" condition.

Although the provision of an auxiliary burner has been described hereinbefore in connection with the burning of HCV and LCV fuels together, it should be appreciated that a condensation problem can arise with HCV fuels, such as fuel oil, which can also contain a certain amount of sulphur giving rise to condensation problems, and thus an auxiliary burner to provide a corrosion free fuel is also useful when only such a primary fuel is being burnt.

Another way in which the corrosion problem described above can arise is if the temperature of the products of combustion falls during normal operation of the boiler as a result, for example, of the efficiency of the boiler being very high, with the result that so much heat is extracted from the products of combustion that their temperature falls below the dewpoint or as a result of the ambient temperature being very low, causing substantial heat losses in the chimney and thus cooling of the products of combustion below the dewpoint.

In this case the problem can be overcome by the arrangement described with reference to FIGS. 4 and 5 and comprises the provision of a number of damper controlled by-passes between the first smoke box and the flue.

Figure 4:
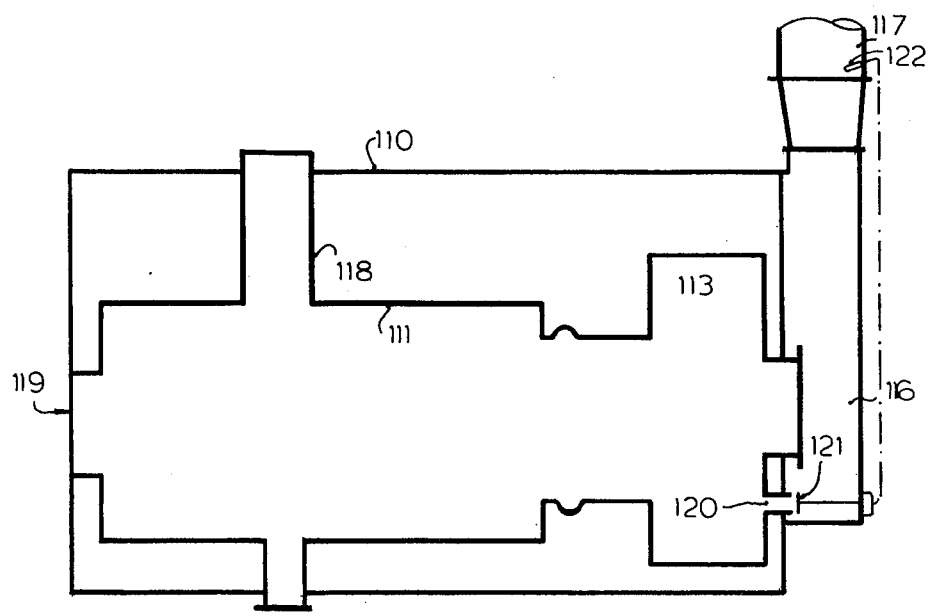
FIG. 4 is a diagrammatic longitudinal sectional view of another embodiment of the invention.
Figure 5:
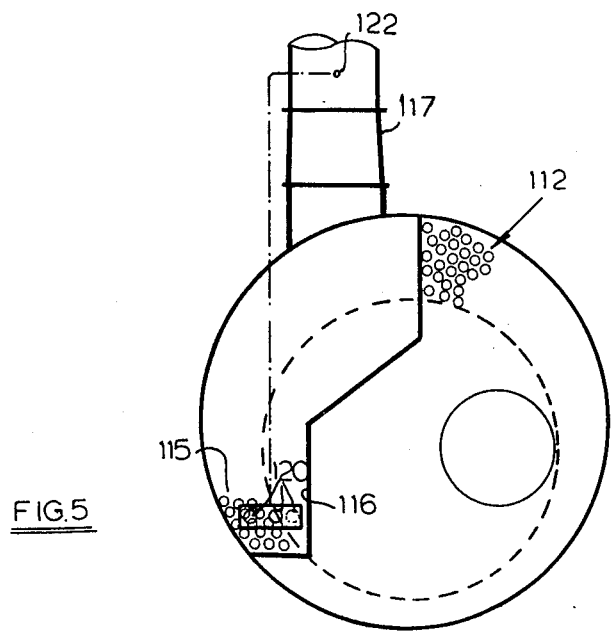
FIG. 5 is a rear elevation of the boiler of FIG. 4.

Referring now to FIGS. 4 and 5, as shown in the drawings, a wet back boiler includes an outer shell 110 within which is located a combustion chamber 111 and a first pass of smoke tubes 112 extending from a first smoke box 113 to a second smoke box, not shown, and a second pass of smoke tubes 115 which extend from the second smoke box 114 to a flue 116 from which extends a chimney 117.

A solid fuel feed tube 118 extends downwardly through the shell and water spaces of the boilers to the combustion chamber 111 and a liquid or gaseous fuel burner may be provided on a door provided at the front end 119 of the combustion chamber 111.

The products of combustion leave the combustion chamber 111 and enter the first smoke box 113 and then normally flow along the first pass of smoke tubes 112 to the second smoke box and then flow along the second pass of smoke tubes 115 to the flue 116 and then leave the boiler through the chimney 117.

A plurality, for example 3, of by-pass tubes 120 are provided between the first smoke box 113 and the flue 116 and a damper 121 is provided to permit the by-pass tubes 120 to be opened or closed by a suitable servo-mechanism under the control of a thermally responsive sensing device 122 located in the chimney 117. If desired the thermo-responsive device may be located in one of the smoke tubes of the sets 112 or 115. If desired, separate dampers can be provided for each by-pass tube and the dampers may be operated independantly to permit of variation in the volume of by-passed gases.

In use, if the temperature in the chimney 117 falls below a predetermined level such that there is a risk of condensation occurring in the chimney, flue or other part of the boiler the thermally responsive device causes the damper 121 to be moved away from closing relationship with the by-pass tubes 120 so that relatively high temperature gas is introduced through the tubes 120 directly into the flue 116 from the smoke box 113. Because the gas in the smoke box 113 has entered thereinto directly from the combustion chamber 111 it will be at a much higher temperature than the gases entering the flue 116 after passage through the smoke tubes and thus will raise the temperature of the gases in the flue above that at which there is a risk of condensation.

When the temperature is above said predetermined value the thermally responsive device causes the damper 121 to be moved into closing engagement with the by-pass tubes 120 so that gases enter the flue 117 only after passage along the smoke tubes.

Because the temperature of the gases in the chimney 117 are dependant upon the temperature of gases fed thereinto through the smoke tubes the thermally responsive device may be located in one of the smoke tubes and be set to operate at a temperature of gas in the smoke tube at the location of the thermally responsive device which corresponds to the temperature at which there is a risk of condensation in the flue.

Although in the above example one particular location and number of by-passes have been described it should be appreciated that the number and positioning of the by-passes can be arranged as described in order to ensure that as large as possible surface area of the flue has relatively high temperature gases supplied thereto.

In an alternative arrangement, not shown, instead of a by-pass between the first smoke box and the flue a by-pass may be provided between the first and second smoke boxes and be controlled by a damper operated in response to a thermo sensitive device responsive to the temperature of the gas either in a smoke tube or in the chimney.

I claim:

1. An industrial boiler installation comprising an outer continuous shell within which is contained the water space of the boiler, a furnace, and a plurality of smoke tubes for passage therethrough of the products of combustion of the furnace, and the boiler having at least two fuel supply means, at least one of which extends through the shell and the water space, one of the fuel supply means supplying HCV fuel to the furnace and the other supplying LCV fuel to the furnace, the boiler including primary fuel supply means operative normally to fire the boiler and an auxiliary fuel supply means operative to supply non-corrosive fuel to fire the boiler and control means to render the primary fuel supply means inoperative and auxiliary fuel supply means operative prior to the boiler being placed in a "low load" condition, wherein the control means includes a pressure sensitive device operative to render the primary fuel supply means inoperative and the auxiliary fuel supply means operative when the pressure of steam produced by the boiler attains a first predetermined value, and operative to place the auxiliary fuel supply means in a "low load" condition when the pressure attains a second, higher predetermined value.

2. An industrial boiler installation comprising an outer continuous shell within which is contained the water space of the boiler, a furnace, and a plurality of smoke tubes for passage therethrough of products of combustion of the furnace, and the boiler having at least two fuel supply means, at least one of which extends through the shell and the water space, one of the fuel supply means supplying HCV fuel to the furnace and the other supplying LCV fuel to the furnace, the boiler having an outlet flue, wherein a plurality of damper controlled by-passes capable of permitting the products of combustion to by-pass the smoke tubes are provided, the by-passes being arranged so as to distribute the relatively hot, by-passed combustion gases over a substantial part of the wall of the outlet flue.

3. A boiler installation according to claim 2 further comprising a thermo-sensitive device responsive to the temperature of the gas in the chimney and operative to control the dampers of the by-passes.

4. A boiler installation according to claim 2 further comprising a thermo-sensitive device responsive to the temperature of the gas in one of the smoke tubes and operative to control the dampers of the by-passes.

5. An industrial boiler installation comprising an outer continuous shell within which is contained the water space of the boiler, a furnace, and a plurality of smoke tubes for passage therethrough of the products of combustion of the furnace, and the boiler having at least two fuel supply means, at least one of which extends through the shell and the water space, one of the fuel supply means supplying HCV fuel to the furnace and the other supplying LCV fuel to the furnace, wherein the boiler is a three pass boiler having a first pass of said smoke tubes parallel to the combustion chamber and spaced transversely thereof, a first smoke box inter-connecting the combustion chamber and one end of said first pass, a second pass of smoke tubes also parallel to the combustion chamber and spaced transversely thereof, a second smoke box inter-connecting the other end of the first pass of smoke tubes and one end of said second pass of smoke tubes, a flue connected to the other end of said second pass of smoke tubes so that the products of combustion pass from the combustion chamber to the flue with two reversals of their direction of flow, and having a damper controlled by-pass which is capable of inter-connecting the first and second smoke boxes to enable a substantial portion of the combustion gases to by-pass the second pass of the smoke tubes when the damper is opened, the damper being controlled by a thermo-sensitive device responsive to the temperature of the gas.

6. An industrial boiler installation according to claim 1, further comprising a steam shut-off valve for preventing the supply of steam from the boiler, wherein the control means is operative to close the steam shut-off valve when the pressure of steam produced by the boiler attains said first predetermined value.

* * * * *